United States Patent [19]
Wing

[11] 4,292,991
[45] Oct. 6, 1981

[54] EROSION RESISTANT VALVE

[75] Inventor: Paul Wing, Hingham, Mass.

[73] Assignee: Masoneilan International, Inc., Norwood, Mass.

[21] Appl. No.: 104,301

[22] Filed: Dec. 17, 1979

[51] Int. Cl.³ .................. F16K 43/00; F16K 47/00
[52] U.S. Cl. .................. 137/329.05; 137/333; 138/46; 251/121; 251/205; 251/63.6
[58] Field of Search ........... 138/46; 251/121, 123, 251/118, 205, DIG. 4, 63.6; 166/91; 175/218; 137/329, 329.01, 329.05, 330, 331, 333; 261/DIG. 38; 188/196 A, 351; 91/6

[56] References Cited

U.S. PATENT DOCUMENTS

| | | | |
|---|---|---|---|
| 2,531,479 | 11/1950 | Southern et al. | 251/120 |
| 3,059,894 | 10/1962 | Knecht | 251/121 |
| 3,508,577 | 4/1970 | Vincent et al. | 137/331 X |
| 3,521,853 | 7/1970 | Gillis et al. | 251/122 |
| 3,628,561 | 12/1971 | Corbett | 137/331 |
| 3,637,054 | 1/1972 | Billeter | 188/196 A |
| 3,693,732 | 9/1972 | Sabi | 166/91 X |
| 3,893,544 | 7/1975 | Means | 188/196 A |
| 4,068,746 | 1/1978 | Munechika | 188/196 A |

Primary Examiner—Martin P. Schwadron
Assistant Examiner—G. L. Walton
Attorney, Agent, or Firm—Cesari & McKenna

[57] ABSTRACT

A valve for use under severe throttling conditions, includes a housing with fluid inlet and outlet passages communicating with a chamber inside the housing. An abrasive resistant throttling tube in fluid communication with the inlet passage projects into the chamber. Also, an abrasive-resistant throttling plug is movably positioned inside the housing so that it can be moved between a first position wherein its end is spaced from the mouth of the throttling tube and a second position wherein it obstructs the mouth of the throttling tube. As mating surfaces of the plug and tube are eroded away by fluid flowing through the valve, the plug is advanced further and further toward the throttling tube so that unabraded surfaces of the plug and tube are presented to one another whereby maximum fluid throttling is achieved despite such wear.

15 Claims, 3 Drawing Figures

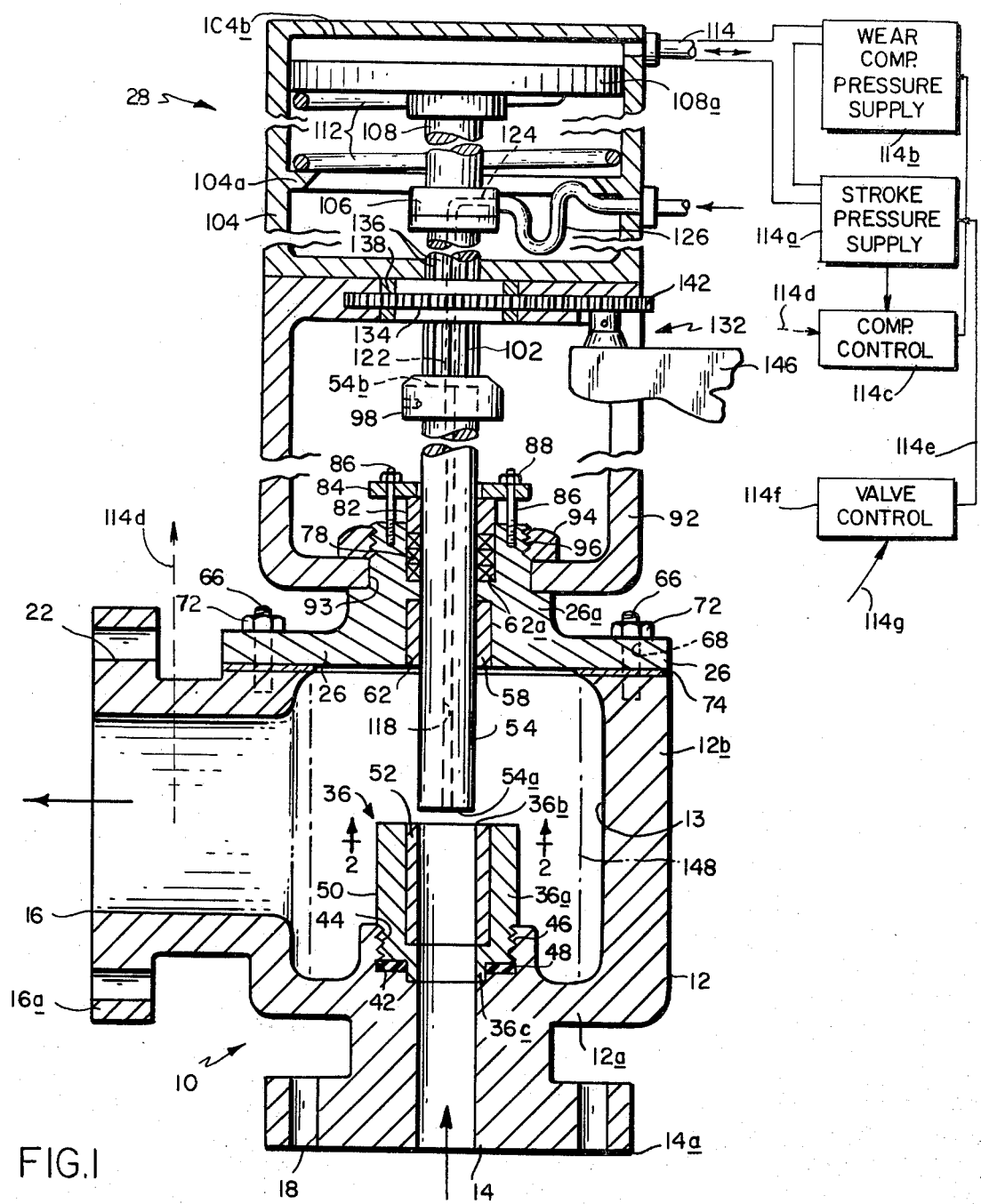
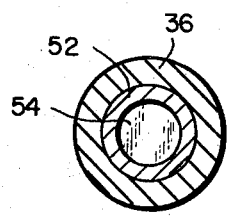
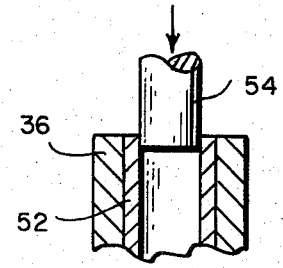
FIG.1
FIG.2
FIG.3

EROSION RESISTANT VALVE

This invention relates to a valve. It relates more particularly to an erosion-resistant valve for use in severe throttling service applications.

BACKGROUND OF THE INVENTION

The valves with which we are concerned here are used to throttle the flow of fluids maintained at very high temperatures (e.g. 850° F.) and pressures (e.g. 2000 psi) and containing abrasive particles, a coal ash slurry for example. In these difficult service applications, the valve parts suffer a considerable amount of erosion and wear. The conventional way to maximize the service life of such valves is by fabricating those valve parts which are particularly prone to erosion of very abrasive resistant materials and specially profiling and streamlining them to achieve smooth fluid flow around those parts. However, such parts made of those hard materials are extremely difficult to fabricate and are therefore quite costly. As a practical matter, then, when designing such valves there is inevitably a compromise made between valve cost and service life.

SUMMARY OF THE INVENTION

Thus it is an object of the present invention to provide a valve which is particularly resistant to erosion.

Another object of the invention is to provide a throttling valve for handling abrasive fluids at high temperatures and pressures and which has a relatively long service life.

Another object of the invention is to provide a valve of this type whose parts can be replaced quickly and easily in the event that becomes necessary.

Still another object of the invention is to provide such a valve which is relatively economical to make and maintain.

Other objects will, in part, be obvious and will, in part, appear hereinafter.

The invention accordingly comprises the features of construction, combination of elements, and arrangement of parts which will be exemplified in the following detailed description, and the scope of the invention will be indicated in the claims.

Briefly, my valve comprises a housing which defines a relatively large, generally cylindrical chamber. An inlet port is formed in the housing and communicating therewith is a tubular throttling tube which projects into the chamber more or less coaxially therewith. That throttling tube, which is more or less centered in the chamber, is formed as a replaceable part. The outlet port is located in the cylindrical wall of the housing and it is positioned appreciably radially outboard of the inner end of the throttling tube.

The valve closure member comprises an elongated throttling plug or rod dimensioned to be snugly received in the mouth of the throttling tube with minimum clearance between the two. The plug is mounted inside the chamber directly opposite the mouth of the throttling tube and is movable between an extended or closed position wherein it projects slightly into the tube to achieve maximum throttling effect and a retracted or open position wherein it is spaced from the mouth of the tube so that it throttles the fluid to a minimum extent. The plug is moved to any setting between these two positions by a more or less conventional actuator mounted to the valve housing and controlled manually or by suitable electric, pneumatic or hydraulic motive means. It should be understood at this point that throttling valves generally are never fully closed or fully open in the sense that the plug does not at all obstruct the incoming fluid. Rather, the valve is arranged to always throttle the fluid flow to some extent between maximum and minimum values. Therefore, the use of the words "open" and "closed" when referring to plug position should be viewed in this context.

With the valve connected to a source of fluid and the throttling plug in its open position, fluid is free to flow through the inlet port and throttling tube into the valve chamber and thence to the valve outlet port. To minimize erosion and wear due to the incoming fluid, the replaceable throttling tube may be constructed of a single piece of erosion-resistant material such as tool steel, cemented carbides or ceramics, for example. Alternatively, it can be provided with a very hard insert or liner of such material at its inner surface which is subjected to the most wear. Likewise, the throttling plug can be made of the same erosion-resistant material or it can be plated or cladded so that it is abraded to a minimum extent by the incoming fluid. Even though the plug and tube are composed of such hard material, being simple, e.g. cylindrical, shapes, they are relatively easy to fabricate.

The walls of the valve chamber are spaced an appreciable distance from the inner end or mouth of the throttling tube. Furthermore, the fluid being throttled, suffers an appreciable pressure drop when entering that large chamber. Therefore, the walls of the valve chamber suffer minimum wear. However, in very severe service applications, a replaceable wall liner or baffle may be positioned inside the valve chamber to protect those walls as will be described later.

To close the valve, the actuator is caused to advance the plug toward the mouth of the throttling tube. When the plug is even with or projects slightly into the mouth of the tube, maximum throttling is achieved. Any residual flow through the valve may be shut off by a separate, conventional shut-off valve.

During normal use of the present valve, the mating surfaces of the throttling plug and tube are inevitably abraded and worn by the fluid. However, in the present valve, this wear is compensated for because the valve actuator is designed to advance the plug further and further toward the throttling tube as the mating surfaces erode away. In other words, the plug is made overly long and the actuator is arranged to feed more and more of the plug length into the tube so that unabraded surfaces of the plug and tube are brought into mating engagement to achieve maximum throttling effect.

Further, the actuator can be arranged to rotate the plug as it is being advanced in order to minimize the likelihood of localized erosion of the mating plug and tube parts. Also, in some severe service applications, the plug may be provided with an axial passage through which oil or other fluid under high pressure is forced to form a film over the end face of the plug so as to effectively prevent the abrasive particles in the incoming fluid from actually touching the plug surfaces at the point of maximum throttling.

Eventually, with repeated valve actuations, the effective length of the plug will be eroded away and that part will have to be replaced. Likewise, the removable throttling tube may have to be replaced. However, this is accomplished simply by removing the valve housing bonnet to gain access to the valve chamber. Then the plug is detached from the actuator and replaced with a new one. Also if necessary, the worn tube can be removed from the valve housing wall and substituted for by a fresh one, or the throttling tube insert (if one is used) may be removed and a new one installed. As soon as the housing bonnet is replaced, the valve can be placed in service again. Thus, the aforesaid replacement of parts can be accomplished quickly and easily so that valve downtime is kept to a minimum.

Accordingly, the present valve can tolerate a considerable amount of parts wear while preserving the effectiveness of the valve. Therefore the time between required valve shutdowns is relatively long. Valve wear for the most part is confined to a few parts which are relatively inexpensive to make and are easily replaceable so that, when it does become necessary to service the valve, this can be done in a minimum amount of time and at minimum cost. Therefore, the present valve should find wide application in the control of the flow of abrasive fluids and in other heavy industrial applications presenting severe throttling problems.

BRIEF DESCRIPTION OF THE DRAWING

For a fuller understanding of the nature and objects of the invention, reference should be had to the following detailed description, taken in connection with the accompanying drawing, in which:

FIG. 1 is a sectional view with parts in elevation of a throttling valve embodying the principles of this invention with the valve shown in its open position;

FIG. 2 is a sectional view along line 2—2 of FIG. 1, and

FIG. 3 is an enlarged fragmentary sectional view showing the valve in its closed position.

DESCRIPTION OF THE PREFERRED EMBODIMENT

Referring now to FIG. 1 of the drawing, my valve shown generally at 10 includes a relatively large, generally cylindrical housing 12 having a bottom wall 12a and a generally cylindrical side wall 12b which together define a relatively large generally cylindrical chamber 13 inside the valve. The valve inlet port 14 is formed in the housing bottom wall 12a and is provided with an external flange 14a. The valve outlet port 16 is formed in the housing side wall 12b and is also flanged at 16a. Usually the outlet port has a larger diameter than the inlet port. Circular arrays of openings 18 and 22 are provided in flanges 14a and 16a to facilitate connecting the valve to upstream and downstream piping. Secured to the top of housing side wall 12b is a bonnet 26 which supports the valve actuator shown generally at 28.

Referring to FIGS. 1 and 2, a throttling tube shown generally at 36 is removably secured to the housing bottom wall 12a inside chamber 13 and coaxially with the inlet port 14. The throttling tube includes a main tubular section 36a whose mouth or end 36b projects a substantial distance into housing chamber 13 and a reduced diameter neck portion 36c which seats in the housing bottom wall 12a. A stepped bore 42 is formed in the housing bottom wall 12a to snugly receive the necked down throttling tube. The upper inside wall of that bore is threaded at 44 to mate with corresponding external threads 46 inscribed on the outside of tube section 36a at the bottom thereof. Also a suitable annular seal 48 surrounds the tube neck portion 36c to provide a fluid-tight seal between the throttling tube 36 and the housing bottom wall 12a.

The throttling tube 36 may be a single unitary piece made of an abrasive-resistant material such as tool steel or a carbide. More preferably and as shown in FIG. 1, the tube may be composed of a main body 50 made of a softer material such as steel and a cylindrical refractory inner liner 52 that forms the surfaces subjected to the most wear when the valve is in use.

Referring particularly to FIG. 1, the illustrated valve closure member comprises simply a cylindrical throttling plug or rod 54 which is disposed opposite and coaxially with the throttling sleeve 36. The diameter of the plug is slightly less than that of the tube mouth 36b and its end 54a is more or less flat.

The plug 54 extends up through a cylindrical bushing 58 positioned in a control passage 62 in bonnet 26 having a neck 26a. The bonnet seats against the top of housing side wall 12b and is secured thereto by a circular array of threaded studs 66 projecting up from the wall 12b through openings 68 near the edge of the bonnet. Nuts 72 turned down onto the ends of the studs clamp the bonnet to the housing flange and an annular seal 74 at the underside of the bonnet prevents fluid leakage between the bonnet and the housing.

An upper section 62a of the bonnet passage 62 inside neck 26a is enlarged to receive a packing ring 78. The ring 78 is compressed between the plug 54 and the wall of passage 62a by a packing follower 82 which is engaged around plug 54 and positioned in passage section 62a of the upper end of bonnet neck 26a thereby forming a fluid-tight rotary and sliding seal between the plug 54 and bonnet 26. Overlying the follower 82 is a ring 84. Threaded studs 86 projecting up from neck 26a extend through openings in the ring and receive nuts 88 to clamp the ring to the bonnet neck 26a.

Mounted to the top of bonnet neck 26a is an enclosure 92 having an opening 93 in its bottom wall which receives the neck. The enclosure is secured to neck 26a by a nut 94 turned down onto exterior threads 96 on the neck. Plug 54 extends through bonnet 26 into enclosure 92 and its upper end 54b is threaded and pinned into a coupling 98 formed at the lower end of a shaft 102. Shaft 102 extends up through the top wall of enclosure 92 into a second enclosure 104 where it is connected by a rotary coupling 106, which permits shaft 102 to rotate with respect to piston rod 108, to one end of a piston rod 108 whose other end terminates in a piston 108a. Enclosure 104 constitutes a hydraulic or pneumatic piston cylinder having a long stroke capability. A compression spring 112 underlying piston 108a and reacting against an internal flange 104a in enclosure 104 biases the piston toward its retracted or raised position. Fluid under pressure introduced into enclosure 104 above piston 108a via a conduit 114 causes the piston to move plug 54 toward tube 36.

Referring to FIG. 1, when the valve 10 is connected in the line, with the plug 54 in its open position as shown in that figure, fluid flows through the valve inlet port 14 into chamber 13 by way of the throttling tube 36. Thence, the fluid leaves the chamber through the outlet port 16. To achieve maximum throttling of the fluid fed to the valve, the actuator 28 advances the plug 54 toward the throttling sleeve 36. The plug is advanced by an amount sufficient to position its end 54a more or less even with or slightly inside the mouth 36b of the throttling tube to the position illustrated in FIG. 3. Typically the stroke of the plug 54 between its fully open and closed positions is about one-fourth of the diameter of the bore or orifice in the throttling tube 36.

When the plug is in the closed position, the flow of fluid into the chamber is throttled to a maximum extent. With this general type of valve, further penetration of the plug into the tube does not result in appreciable further stoppage of fluid flow. Rather, complete stoppage of the fluid (if this is desired) is achieved by means of a completely separate shut-off valve (not shown) positioned in the pipe in line with the valve 10. Of course, intermediate throttling values are achieved by positioning the plug end 54a at appropriate distances from the mouth of tube 36.

As the valve performs its throttling function, erosion will occur primarily at the lower end of plug 54 and at the upper inner surface portion of the throttling tube 36 (or more particularly its liner 52). Consequently, with a conventional fixed-stroke type valve, after such wear, the valve may not perform its throttling function properly. With the present valve, however, such erosion is compensated for by making the plug several times longer than its normal operating stroke and controlling actuator 28 so as to progressively shift the operating stroke of valve plug 54 toward tube 36. In other words, for maximum throttling, plug 54 is advanced toward the throttling sleeve 36 until a substantially unabraded, full diameter end segment of the plug intercepts a non-eroded segment of the tube liner 52. For example in a valve with a tube 36 having a two inch bore, the distance traveled by plug 54 between its open and closed positions might be on the order of one-half inch. Consequently, the plug would be made, say, one inch long so that as the end 54a of the plug erodes away, the plug can be advanced over a period of time, further and further toward the throttling tube 36 much like a pencil into a pencil sharpener as needed to achieve maximum throttling effect despite such wear.

Operation of the actuator 28 to progressively shift the operating stroke of valve plug 54 toward tube 36 requires that the pressurized fluid provided through conduit 114 to chamber 104b (the portion of enclosure 104 above piston 108a) be formed from two components. A first component is provided by a stroke pressure fluid supply 114a and a second component is provided by a wear-compensating pressure fluid supply 114b. The fluid pressure provided by stroke pressure supply 114a is used to extend the throttling plug from its base, retracted position toward its extended, or throttling, position. The wear-compensating pressure supply 114b provides fluid pressure to advance the retracted position of the throttling plug so that the plug end will reach the throttling position when extended. Thus, wear-compensating pressure supply 114b provides a continuous bias pressure to which the regulated stroke pressure provided by supply 114a is added. The stroke pressure from supply 114a is varied in order to stroke the throttling plug between its retracted and extended positions. It will be seen that the need for compensating pressure is due to the fact that stroke pressure normally is provided as having a defined range. When the stroke pressure reaches its upper limit, the stroke pressure supply is ineffective to produce the desired throttling by advancing the plug further. This is sensed by a compensation control system 114c, which responds to insufficient throttling by causing wear-compensating pressure supply 114b to provide more pressure. The control system 114c may sense stroke pressure limit alone or stroke pressure and valve output flow, as at 114d. Stroke control is provided by a signal on line 114e which is provided by a valve controller 114f which, in turn, actuates the stroke supply 114a, responsive to some system parameter received on line 114g.

With the stroke pressure at its minimum, the wear-compensating pressure of supply 114b establishes the retracted position of the throttling plug. The wear-compensating pressure is gradually increased, independently of stroke pressure, as the end of the throttling plug erodes, to advance the retracted position (and, correspondingly, the extended position) as required to adjust or compensate for such erosion. Because both pressure supplies feed the same chamber 104b, the pressure therein is an additive combination of the two. Therefore, it is also possible in an appropriate situation to combine the two supplies into one. Naturally, many other actuators could be employed to achieve the same throttling plug motion; that is, an advancement of the retracted position which the plug assumes at one limit of its stroke such that the determination of such retracted position is accomplished independently of the stroking of the plug from the retracted position to a second limit, or extended or throttling position. For example, a short stroke piston actuator can be used in conjunction with some means to advance the plug relative to the piston. Likewise, mechanical or electromechanical actuators may be used. After prolonged valve service, the erosion of the plug 54 and the tube liner 52 may become extensive enough to require replacement of those parts. Such replacement is easily effected, however, simply by unscrewing the nuts 72 and removing the valve bonnet 26 from housing 12. This provides access to the housing chamber 13 so that the throttling tube 36 can be unscrewed from the housing bottom wall 12a. Also, of course, the plug 54 can be unscrewed easily from the coupling 98. After a fresh tube and plug are installed in place, the bonnet 26 can be re-secured to the housing 12, all of this taking a very minimum amount of time. Since the replacement parts are simple cylindrical pieces, they can be formed relatively easily and inexpensively even though made of hard abrasive-resistant material.

In some applications, to minimize the erosion of plug 54, a coating of oil can be maintained over the plug end 54a. More particularly, the plug 54 may be provided with an axial passage extending to its end 54a as shown in dotted lines at 118 in FIG. 1. Oil or other fluid under high pressure can then be supplied to the passage 118 by way of a passage 122 in shaft 102 communication via a passage 124 in coupling 106 with a flexible hose 126 leading out of enclosure 104. The high pressure oil upon reaching the lower end of the passage 118 issues forth and blankets the plug end 54a, protecting it from the abrasive action of the incoming fluid.

Preferably the chamber 13 in the valve housing is sufficiently large in relation to tube 36 that the housing side wall 12b is spaced appreciably from the tube. That, coupled with the fact that the incoming fluid suffers a pressure drop upon entering the chamber 13, means that the housing walls should not be abraded to any great extent by the fluid. However, to even further minimize the effects of the fluid on the housing walls, a replaceable cylindrical baffle or liner indicated in dotted lines at 148 in FIG. 1 can be positioned in the chamber to bear the brunt of the fluid and direct it efficiently toward the valve outlet passage 16.

In some applications, in order to minimize localized erosion of the plug end 54a and sleeve liner 52, provision may be made for rotating the plug independently of its lineal actuation. With such an arrangement, the opposing or mating edges or segments of the plug and throttling tube liner are shifted circumferentially relative to one another. This is accomplished in the illustrated valve by a gear drive 132 mounted in the wall of enclosure 92. It includes a ring gear 134 engaged about shaft 102 and whose center is broached to receive splines 136 formed on that shaft. Gear 132 is mounted in the top wall of enclosure 92 between bushings 138. The gear meshes with a sprocket 142 driven by an electric motor 146 mounted to the enclosure wall. Thus the shaft 102 is free to slide up and down relative to gear 134 in response to actuations of the piston 108a. However, the shaft (and therefore plug 54) may also be rotated independently by motor 146 when that is deemed necessary. Of course, in a non-rotative valve emodiment, the gear drive 132 and splined rod 102 may be eliminated with the plug 54 being coupled directly to a longer piston rod 108.

It will be seen from the foregoing then that the present valve is capable of controlling the flow of abrasive fluids such as coal slurry under high temperature and pressure conditions without suffering undue parts wear. Yet the valve is relatively inexpensive to make. Such surface erosion as does occur is confined primarily to two replaceable parts namely the throttling plug 54 and throttling tube liner 52. However, as those parts are eroded by the fluid, such erosion is compensated for by advancing the plug further and further toward the throttling tube liner thereby presenting fresh noneroded plug and liner surfaces to one another to achieve maximum throttling. When substantially the entire length of the plug has been "used up" in this fashion, the plug and sleeve (if need be) are easily replaceable with fresh parts. Further, even those replacement parts are relatively inexpensive since they are simple cylindrical shapes which can be formed relatively easily using conventional techniques. Resultantly, my valve should find wide service particularly in those applications involving severe throttling conditions.

It will also be seen that the objects set forth above, among those made apparent from the preceding description, are efficiently attained. Also, certain changes may be made in the above construction without departing from the scope of the invention. For example, the valve plug can be actuated manually or by hydraulic, pneumatic or other motive devices. Also, fluid can be flowed through valve 10 in the opposite direction and still the valve will have a long service life. Therefore, it is intended that all matter contained in the above description or shown in the accompanying drawing shall be interpreted as illustrative and not in a limiting sense.

It is also to be understood that the following claims are intended to cover all of the generic and specific features of the invention herein described.

What is claimed as new and desired to be secured by Letters Patent of the United States is:

1. A throttling valve comprising:
   A. a valve housing defining a chamber,
   B. means in the housing wall defining a first fluid passage into the chamber,
   C. means in the housing wall defining a second fluid passage into the chamber, said second passage being spaced from said first passage,
   D. tubular throttling means mounted to the housing wall, said throttling means being in fluid communication with the first passage, and having a mouth projecting into the chamber,
   E. a throttling plug having an end,
   F. means for positioning the plug inside the chamber substantially in line with the throttling means,
   G. means for moving an uneroded segment of the plug end between a first, extended position and a second, retracted position, such extended and retracted positions defining the plug stroke, and
   H. means for moving the plug progressively further toward the throttling means, independent of plug stroke, as fluid flowing into the valve erodes the end of the plug, thereby compensating for erosion of the plug end and changing the portion of the plug stroked between said extended and retracted positions whereby in the first, extended position the uneroded segment of the plug end obstructs the mouth of the throttling means to achieve maximum throttling effect.

2. The valve defined in claim 1 wherein the throttling means extends appreciably into the chamber.

3. The valve defined in claim 2 wherein the housing is large in relation to the mouth of the throttling means so that the walls of the chamber are spaced appreciably from the mouth.

4. The valve defined in claim 1 wherein the opposing surfaces of the plug and throttling means are made of an abrasive resistant material.

5. The valve defined in claim 4 wherein the plug and throttling means each comprises a unitary part.

6. The valve defined in claim 4 wherein one or both of the plug and throttling means comprises a composite part which includes a support member and means defining said abrasive resistant surfaces and secured to the support member.

7. The valve defined in claim 1 wherein the throttling means is removably mounted to the housing wall.

8. The valve defined in claim 1 wherein the plug is removably connected to the positioning means.

9. The valve defined in claim 1 wherein
   A. the tube mouth is circular,
   B. the plug is cylindrical with a diameter no larger than that of the tube mouth, and
   C. the length of the plug exceeds one-fourth the tube mouth diameter so that it exceeds the plug stroke distance between the maximum and minimum throttling positions of the plug.

10. A throttling valve comprising:
    A. a valve housing defining a chamber,
    B. means in the housing wall defining a first fluid passage into the chamber,
    C. means in the housing wall defining a second fluid passage into the chamber, said second passage being spaced from said first passage,
    D. tubular throttlin means mounted to the housing wall, said throttling means being in fluid communication with the first passage, and having a mouth projecting into the chamber,
    E. a throttling plug having an end,
    F. means for positioning the plug inside the chamber substantially in line with the throttling means,
    G. means for moving the plug progressively further toward the throttling means as fluid flowing into the valve erodes the end of the plug, whereby an uneroded end segment of the plug can be moved into position to obstruct the mouth of the throttling means to achieve maximum throttling effect despite such wear,
    H. the plug having a fluid passage extending therealong, and I. means for injecting fluid under pressure into said plug passage so that it issues from and coats the end of the plug inside the end of the chamber to protect the plug from erosion.

11. In a throttling valve for throttling the flow of fluids maintained at high temperatures and pressures and containing abrasive particles, such a valve being of the type having a throttling tube and a throttling plug for obstructing the flow of fluid from the throttling tube, the improvement comprising:

the throttling plug having an end adapted to be inserted into the throttling tube and dimensioned to obstruct the flow of fluid therefrom when inserted into the throttling tube;

means for advancing the end of the throttling plug from a first, retracted position to a second, extended position, such positions defining plug stroke, to change from minimum to maximum throttling effect;

means for moving the plug end progressively further toward or into the throttling tube as fluid flowing into the valve erodes the end of the plug, independently of plug stroke, thereby moving both the retracted position and the extended position toward the throttling tube by a like amount and changing the portion of the plug which obstructs the mouth of the throttling tube, so that the valve may continue to provide maximum throttling effect when the plug is in the second, extended position, despite the erosion of the end of the plug.

12. The throttling valve of claim 11 wherein the throttling tube is further provided with an interior surface liner which is easily removable and replaceable.

13. The throttling valve of either claim 11 or claim 12 wherein the throttling plug is comprised of a first, shaft member and a second, tip member, the tip member being removably attached to the shaft member to facilitate replacement of the tip member, the tip member containing the plug end which is adapted to be used to obstruct the mouth of the throttling tube.

14. The throttling valve of claim 11 wherein the means for advancing the plug comprises an actuator operably connected to the throttling plug for moving the plug through a predetermined stroke, the range of motion of the actuator substantially exceeding the plug stroke, whereby the plug end may be advanced toward the throttling tube as it is eroded, substantially independently of the plug stroke.

15. A throttling valve comprising:
A. a valve housing defining a chamber;
B. means in the housing wall defining a first fluid passage into the chamber;
C. means in the housing wall defining a second fluid passage into the chamber, said second passage being spaced from said first passage;
D. tubular throttling means mounted to the housing wall, said throttling means being in fluid communication with the first passage and having a mouth projecting into the chamber;
E. a throttling plug having first and second ends;
F. means for positioning the plug with a first end inside the chamber and the second end outside the chamber, the plug further being positioned substantially in line with the throttling means;
G. exterior to the chamber, an actuator including
 1. a chamber,
 2. a piston disposed in the chamber, the piston being adapted to move reciprocally in the longitudinal direction of the plug,
 3. the second end of the plug being operatively connected to the piston,
 4. means for supplying fluid pressure to one side of the piston to effectuate reciprocal motion of the plug, the means for supplying fluid pressure including means for supplying continuous pressure, such continuous pressure being adjustable to advance the first end of the plug toward the throttling means to compensate for erosion of the first end of the plug and means for supplying regulated fluid pressure to stroke the plug between a retracted position and an extended position.

* * * * *